United States Patent [19]

Takatori

[11] Patent Number: 4,745,502
[45] Date of Patent: May 17, 1988

[54] ROTARY MAGNETIC SHEET APPARATUS
[75] Inventor: Naoki Takatori, Tokyo, Japan
[73] Assignee: Fuji Photo Film Co., Ltd., Japan
[21] Appl. No.: 872,964
[22] Filed: Jun. 11, 1986
[30] Foreign Application Priority Data
  Jun. 17, 1985 [JP]  Japan .................... 60-129975
  May 19, 1986 [JP]  Japan .................... 61-112674
[51] Int. Cl.$^4$ ............................ G11B 25/04
[52] U.S. Cl. .............................. 360/99; 360/88
[58] Field of Search ............... 360/97–99, 360/133, 105, 106, 88

[56] References Cited
FOREIGN PATENT DOCUMENTS
2138197A 10/1984 United Kingdom ............ 360/99

Primary Examiner—John H. Wolff
Attorney, Agent, or Firm—Abelman Frayne Rezac & Schwab

[57] ABSTRACT

A rotary magnetic sheet apparatus for recording and reproducing still picture information on and from a magnetic recording medium in the form of a magnetic sheet comprises a drive motor causing rotation of a magnetic sheet mounted at its center core on a drive shaft of the motor, a center-core pressing member disposed opposite to the drive shaft on the side nearer to the center core than the drive shaft so as to press the center core onto the drive shaft, and a member or members for mechanically connecting a movable part of the actuating switch to the center-core pressing member to cause operation of the center-core pressing member in response to manipulation of the actuating switch.

5 Claims, 9 Drawing Sheets

ROTARY MAGNETIC SHEET APPARATUS

FIELD OF THE INVENTION

This invention relates to a rotary magnetic sheet apparatus for recording and reproducing still picture information on and from a magnetic recording medium which is in the form of a magnetic sheet.

STATEMENT OF RELATED ART

An electronic still camera system has been developed and attracts now public attention. In such a system, an image pickup device such as a solid-state image sensing device or an image pickup tube is combined with a recording device in which a magnetic sheet, which is inexpensive and has a relatively large storage capacity, is used as a recording medium, so as to purely electronically take a still picture of a subject and record it on a rotary magnetic sheet. The recorded picture is reproduced and displayed or printed by means such as a television system or a printer separately provided.

The magnetic sheet employed in such a still camera system is generally supplied in the form of a magnetic sheet pack. The magnetic sheet used for magnetic recording of still picture information is rotatably accommodated inside the magnetic sheet pack, and this magnetic sheet pack is loaded in a rotary magnetic sheet apparatus incorporated in, for example, an electronic camera.

In a picture recording or reproducing system using such a magnetic sheet, the diameter of the magnetic sheet is generally about 50 mm, and a recording pattern ranging from a 1st track to a 52nd track is formed in a high density toward the inner periphery from an outer peripheral part of the magnetic sheet. In such a rotary magnetic sheet apparatus, a magnetic head is moved with a pitch of only about 100 $\mu$m which is far smaller than that in a conventional floppy disk. Therefore, the magnetic sheet must be positioned relative to the magnetic head with very high accuracy.

FIG. 6 is a plan view of a magnetic sheet pack of this kind employed in a rotary magnetic sheet apparatus, and FIG. 7 is a sectional view taken along the line VII—VII in FIG. 6 to illustrate the state of a magnetic sheet mounted on a drive shaft in the rotary magnetic sheet apparatus. As shown in FIG. 6, the magnetic sheet pack 21 has a generally square shape, and a magnetic sheet 22 recording still picture data or like information is rotatably accommodated inside the magnetic sheet pack 21. The magnetic sheet 22 is provided at its central part with a center core 23 acting as a reinforcement, and this center core 23 is externally exposed from a circular central opening 24 of the magnetic sheet pack 21. The center core 23 is formed with a polygonal insertion hole 25 into which a driven shaft 31 of a drive motor (not shown) in the rotary magnetic sheet apparatus is inserted, and a slit 26 is formed along and in close proximity to one of the polygonal edges of the hole 25. By the spring action of the slit 26, the confronting three sides of the polygonal hole 25 are pressed onto the drive shaft 31, thereby accurately centering the magnetic sheet 22 relative to the drive shaft 31.

The magnetic sheet pack 21 is further formed with a window 27 at a position corresponding to the position of a magnetic head (not shown), and this window 27 is openably closed by a slidable shutter 28. That is, before the magnetic sheet pack 21 is loaded in the rotary magnetic sheet apparatus, the shutter 28 closes the window 27 to prevent dust from attaching to the magnetic sheet 22, but, when the magnetic sheet pack 21 is loaded in the rotary magnetic sheet apparatus, the shutter 28 slides downward in FIG. 6 as shown by the arrow to open the window 27, thereby permitting recording and reproduction of information on and from the magnetic sheet 22 by the magnetic head. The magnetic sheet pack 21 is further formed with a plurality of positioning holes 30.

A magnet is utilized as a means for detachably fixing the magnetic sheet 22 to the drive shaft 31. Referring to FIG. 7, an annular magnet 32 is disposed on a flanged portion 31a of the drive shaft 31, and an attraction yoke 33 made of a magnetic material is secured to the center core 23 of the magnetic sheet 22. The attraction yoke 33 is attracted by the magnet 32 so that the center core 23 is detachably fixed to the drive shaft 31. The lines of magnetic force from the magnet 32 are also guided by a PG yoke 34 toward the upper surface of the center core 23, and this PG yoke 34 is utilized to determine the angular position of rotation of the magnetic sheet 22.

When the center core 23 of the magnetic sheet 22 is fitted on the drive shaft 31, the center core 23 is pressed onto the drive shaft 31 by the spring action of the slit 26 provided for the purpose of centering the magnetic sheet 22 relative to the drive shaft 31, as described above. This spring action of the slit 26 provides a slight resistance against insertion of the drive shaft 31. On the other hand, the magnetic sheet pack 21 has a slight play relative to the magnetic sheet 22 in the direction of the rotary axis of the magnetic sheet 22. Therefore, when the magnetic sheet pack 21 is loaded in the magnetic sheet sheet apparatus, the attraction yoke 33 of the center core 23 will not be brought into intimate engagement with the flanged portion 31a of the drive shaft 31 due to the resistance provided by the spring action of the slit 26 of the center core 23, and will be spaced by an excessively large distance from the magnet 32. In such a case, the attraction yoke 33 will not be sufficiently attracted by the attracting force of the magnet 32, resulting in such a situation that vertical fluttering of the magnetic sheet 22 relative to the plane of rotation occurs to generate unusual sound, and the magnetic head cannot satisfactorily touch the magnetic sheet 22. When the above situation occurs, information cannot be sufficiently recorded on or reproduced from the magnetic sheet 22. To avoid such an objectionable situation, a so-called center-core pressing function is required according to which, during loading the magnetic sheet pack 21 in the rotary magnetic sheet apparatus, the center core 23 of the magnetic sheet 22 is pressed onto the flanged portion 31a of the drive shaft 31 to bring the attraction yoke 33 into intimate engagement with the flanged portion 31a, thereby securely holding and fixing the center core 23 to the drive shaft 31 by the attracting force of the magnet 32. In order to attain this center-core pressing member (not shown) disposed at a position opposite to the drive shaft 31, with the center core 23 being interposed therebetween, is actuated to press the center core 23 onto the flanged portion 31a of the drive shaft 31. According to a prior art practice, this center-core pressing member is arranged to operate in interlocking relation with the movement of a cover member which is opened and then closed during loading the magnetic sheet pack 21 in the rotary magnetic sheet apparatus. When the cover member is closed, the center-core pressing member is driven to press the center core 23 onto the flanged portion 31a of the driven shaft 31. However, when the center-core pressing member remains in the state pressing the center core 23 onto the flanged portion 31a of the drive shaft 31 during rotation of the magnetic sheet 22, not only the center-core pressing member acts as a source of a resistance against the smooth rotation of the magnetic sheet 22, but also it will import damage to the center core 23. Accordingly, during rotation of the magnetic sheet 22, the center-core pressing member must be retracted to a position spaced apart from the center core 23. That is, a complex behavior is required for the center-core pressing member such that, while the cover member is being closed, the center-core pressing member engages and presses the center core 23, but, after the cover member is completely closed, the center-core pressing member must be retracted to the position spaced apart from the center core 23. Thus, the structure of the cover-member opening and closing mechanism has inevitably become complicated.

SUMMARY OF THE INVENTION

With a view to solve the prior art problem pointed out above, it is a primary object of the present invention to provide a rotary magnetic sheet apparatus which can reliably achieve the center-core pressing function without complicating the cover-member opening and closing mechanism.

In accordance with the present invention which attains the above object, there is provided a rotary magnetic sheet apparatus comprising an actuating switching for energizing a drive motor causing rotation of a magnetic sheet mounted at a center core thereof on a drive shaft of the motion, center-core pressing means disposed opposite to the drive on the side nearer to the center core than the drive shaft so as to press the center core onto the drive shaft, and means for mechanically connecting a movable part of the actuating switch to the center-core pressing means to cause operation of the center-core pressing means in response to manipulation of the actuating switch.

Other hand further objects, features and advantages of the present invention will appear more fully from the following description.

BRIEF DESCRIPTION OF THE DRAWINGS

FIGS. 1 to 5 show a first embodiment of the rotary magnetic sheet apparatus according to the present invention, in which FIG. 1 is a schematic sectional view of part of the rotary magnetic sheet apparatus; FIG. 2 is a schematic perspective view of the rotary magnetic sheet apparatus; FIG. 3 is a schematic sectional view of the entire rotary magnetic sheet apparatus; FIG. 4 is a schematic perspective view of the actuating switch button and associated parts shown in FIG. 1; and FIG. 5 illustrates the shape of the cam groove shown in FIG. 4.

FIGS. 10 to 14 show a third embodiment of the present invention employing an actuating switch of slide type, in which FIGS. 10 and 11 are schematic sectional views of part of the rotary magnetic sheet apparatus respectively; FIG. 12 is a schematic perspective view of the rotary magnetic sheet apparatus; FIG. 13 is a partly cut-away, schematic plan view of the actuating switch and associated parts; and FIG. 14 is a schematic sectional view taken along the line XIV—XIV in FIG. 13.

FIGS. 15 to 21 show a fourth embodiment of the present invention employing an actuating switch of rotary type, in which FIGS. 15 and 16 are schematic sectional views of part of the rotary magnetic sheet apparatus respectively; FIG. 17 is a schematic perspective view of the rotary magnetic sheet apparatus; FIG. 18 is a schematic sectional view taken along the line XVIII—XVIII in FIG. 15; and FIGS. 19, 20 and 21 are schematic side elevation views of the knob and associated parts of the rotary switch respectively.

DESCRIPTION OF THE PREFERRED EMBODIMENTS

Figure 1:
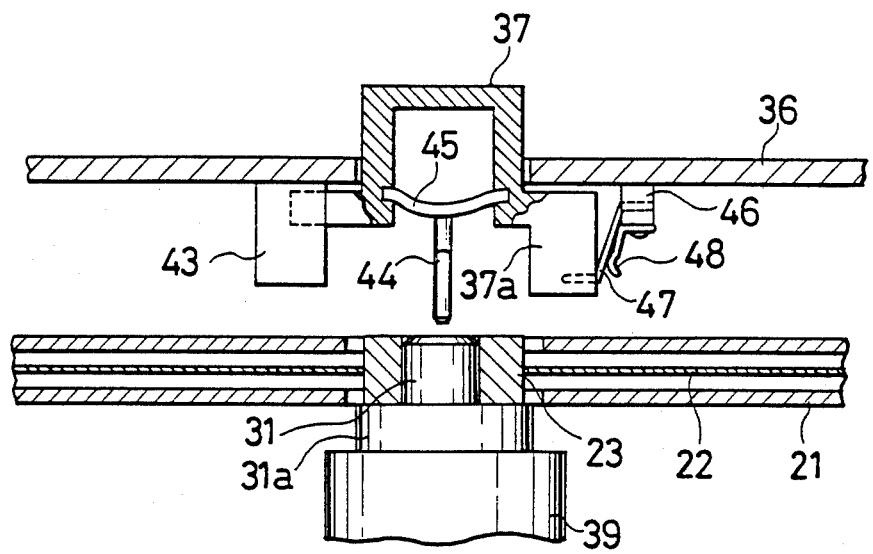

Preferred embodiments of the present invention will be described in detail with reference to the drawings.

A first embodiment of the present invention will be first described with reference to FIGS. 1 to 5. The first embodiment represents an application of the present invention to a reproducing apparatus of portable type. Referring to FIG. 2, the reproducing apparatus of portable type includes a main body or casing 35 having an opening in its upper wall. This opening is openably closed by a cover member 36 hinged to one of the edges of the opening. A switch button 37 of an actuating switch for playback purpose is disposed at a central part of the cover member 36, and a group of switch buttons 38 including those of an eject switch and a fast forward switch are disposed on the upper wall of the casing 35 on one side of the actuating switch button 37. After opening the cover member 36, the aforementioned magnetic sheet pack 21 is loaded in the casing 35 of the reproducing apparatus so that picture data information recorded on the magnetic sheet can be reproduced and displayed or printed by means such as a television system or a printer (not shown).

Figure 3:
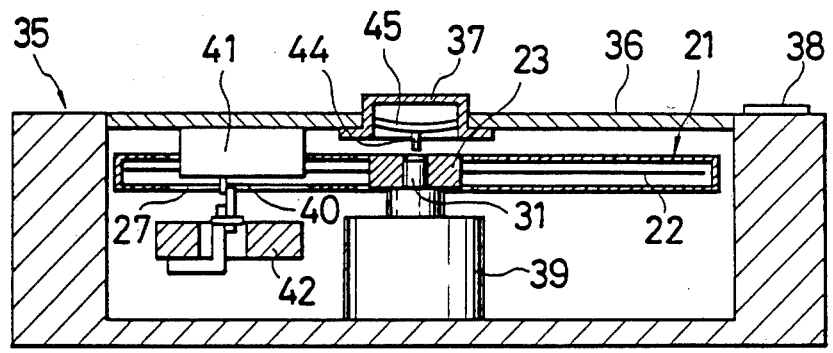

Referring to FIG. 3, a magnetic-sheet drive motor 39 is fixedly disposed at the center of the internal space of the casing 35, and its drive shaft 31 extends toward the cover member 36. The magnetic sheet 22 is detachably mounted at its center core 23 on the drive shaft 31 to be rotated at a predetermined rotation speed. A magnetic head 40 and a regulating member 41 are disposed opposite to each other in the casing 35 at a position corresponding to the position of the aforementioned window 27, so that, when the magnetic sheet pack 21 is loaded in the casing 35, the magnetic head 40 and the regulating member 41 can engage the lower and upper surfaces respectively of the magnetic sheet 22. The magnetic head 40 is supported on a carriage 42, and this carriage 42 is moved by a drive unit (not shown), so that the magnetic head 40 can be positioned at any desired radial position relative to the magnetic sheet 22. On the other hand, the regulating member 41 is mounted on the lower surface of the cover member 36, so that it can be positioned at a predetermined position as described above when the cover member 36 is closed.

Figure 2:
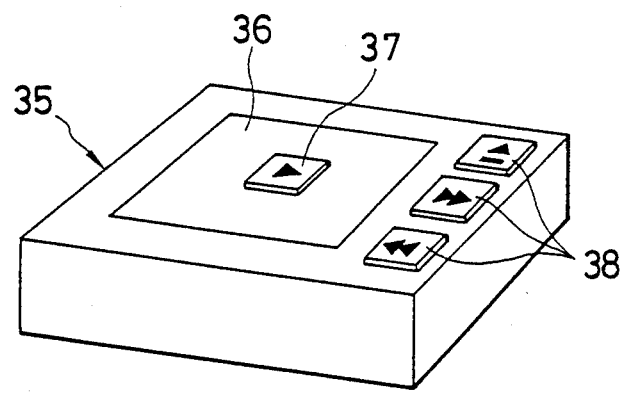

Referring to FIG. 1, the cover member 36 is formed with a central opening, and the playback-purpose actuating switch button 37 is supposed in this central opening, so that the switch button 37 can move in a direction parallel to the axis of the drive shaft 31 (in the vertical direction in FIG. 1) by being guided by a guide 43 fixed to the lower surface of the cover member 36. The actuating switch button 37 is normally urged upward in FIG. 1 by a spring (not shown). The upper end of the switch button 37 protrudes from the cover member 36 to be manipulated by a user, and the lower end thereof is opposed by the upper end of the drive shaft 31. A center-core pressing member 44 is fixed at its upper end to a connecting member 45 of a resilient material mounted in the lower end of the actuating switch button 37, so that the center core 23 of the magnetic sheet 22 mounted on the drive shaft 31 can be present by the center-core pressing member 44 onto the flanged portion 31a of the drive shaft 31. The lower end of the center-core pressing member 44 is bifurcated so as to abut the upper surface of the center core 23 at the bifurcated end portions.

Figure 4:
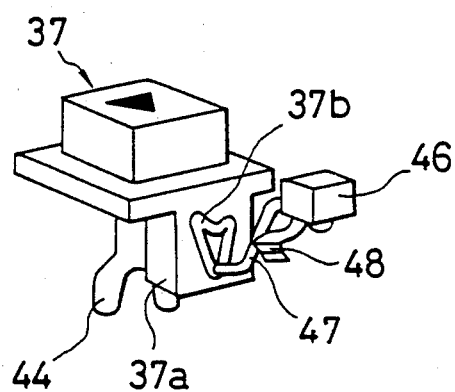
Figure 5:
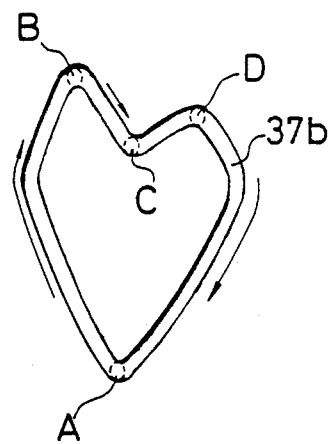
Figure 6:
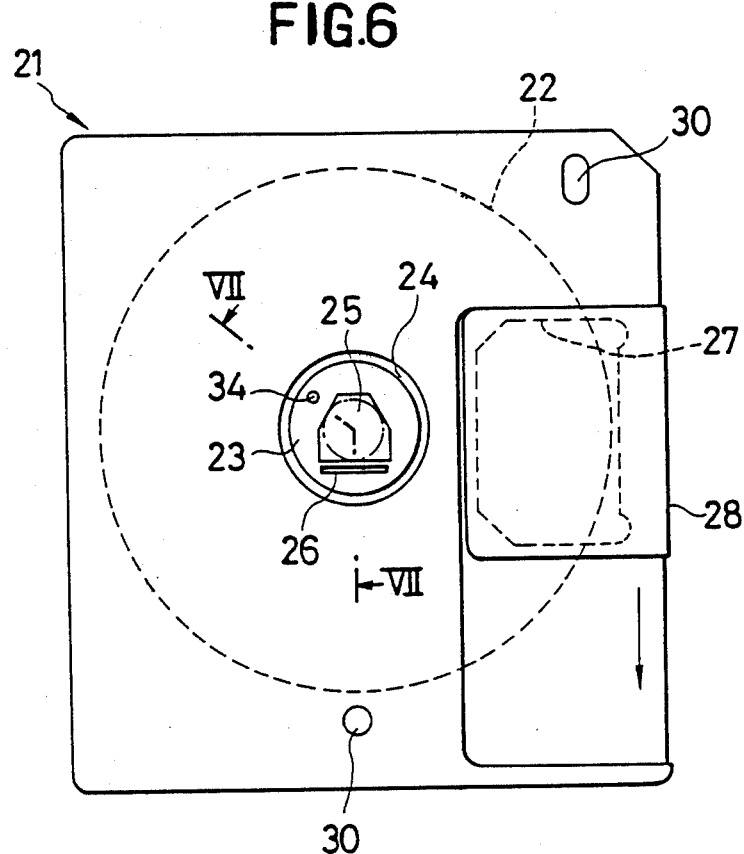
FIG. 6 is a plan view of a magnetic sheet pack used in the rotary magnet sheet apparatus.
Figure 7:
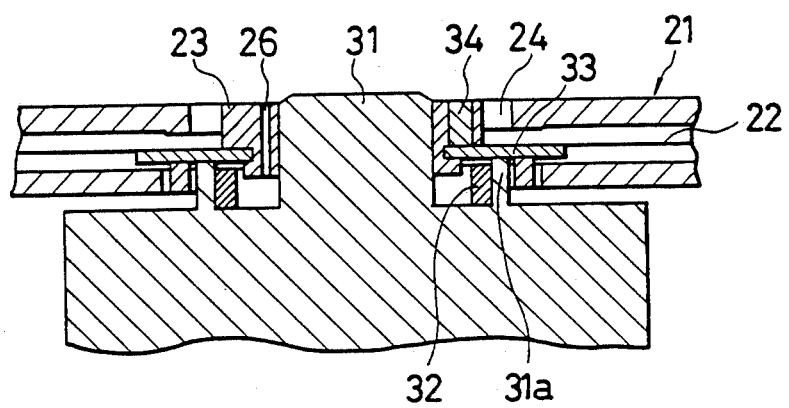
FIG. 7 is a sectional view taken along the line VII—VII in FIG. 6 to illustrate the state of a magnetic sheet mounted on a drive shaft of a drive motor in the rotary magnetic sheet apparatus.

Referring to FIGS. 1 and 4, the actuating switch button 37 is provided with a downward extension 37a formed with a cam groove 37b. A pin 47 is fixed at one end thereof to the cover member 36 through a fitting 46 and is fitted at the other or free end thereof in the cam groove 37b. The pin 47 is biased by a leaf spring 48 fixed to the fitting 46, so that the free end of the pin 47 is always forced onto the bottom of the cam groove 37b. Therefore, when the actuating switch button 37 makes its vertical movement, the free end of the pin 47 moves along the cam groove 37b, and the position of the actuating switch button 37 is controlled by the position of the pin 47. Describing in further detail, the cam groove 37b has a generally heart-like shape as shown in FIG. 5. In a non-depressed state of the actuating switch button 37, the actuating switch button 37 urged by the spring (not shown) is in its upper position, and the free end of the pin 47 is situated at a lowermost point A of the cam groove 37b. Then, when the actuating switch button 37 is depressed to turn on the actuating switch, the extension 37a makes corresponding downward movement to cause relative movement of the free end of the pin 47 in a direction as shown by the left-hand arrow in FIG. 5. Thus, in a downwardmost depressed state of the actuating switch button 37, the free end of the pin 47 is situated at an uppermost point B of the cam groove 37b. When the free end of the pin 47 reaches a position near the uppermost point B of the cam groove 37b in the course of its movement from the lowermost point A to the uppermost point B due to the depression of the actuating switch button 37, the center-core pressing member 44 abuts the center core 23 of the magnetic sheet 22. As the actuating switch button 37 is further depressed until the free end of the pin 47 reaches the uppermost point B of the cam groove 37b, the center-core pressing member 44 imparts downward pressure to the center core 23. Then, when the depression of the actuating switch button 37 is released, the actuating switch button 37 is urged upward by the force of the spring. When the fre end of the pin 47 reaches a switch-on point C of the cam groove 37b, the actuating switch button 37 ceases its upward movement by being restricted by the pin 47. The actuating switch is turned on when the free end of the pin 47 is brought to the switch-on point C of the cam groove 37b. In response to the output signal of the actuating switch, a control circuit (not shown) acts to energize the magnetic-sheet drive motor 39 so as to rotate the magnetic sheet 22, and information recorded on the magnetic sheet 22 is reproduced by the magnetic head 40. The turning-on of the actuating switch is achieved by, for example, providing a conductive member at the switch-on point C of the cam groove 37b so that, when the free end of the pin 47 is brought to the switch-on point C, the free end of the pin 47 contacts the conductive member thereby turning on the actuating switch. In another example, the cam groove 37b is bored deep at the switch-on point C, and a microswitch is buried in the switch-on point C, so that, when the free end of the pin is brought to the switch-on point C, the microswitch is energized by the pin 47 thereby turning on the actuating switch. In the course of the movement of the free end of the pin 47 from the uppermost point B to the switch-on point C of the cam groove 37b due to the upward movement of the actuating switch button 37, the center-core pressing member 44 starts to move away from the center core 23. When the free end of the pin 47 reaches the switch-on point C of the cam groove 37b, the center-core pressing member 44 is completely separated from the center core 23.

When it is desired to turn off the actuating switch thereby stopping the playback mode, the actuating switch button 37 is depressed again. The free end of the pin 47 moves from the switch-on point C to a hill point D of the cam groove 37b thereby turning off the actuating switch. After the free end of the pin 47 has moved past the hill point D of the cam groove 37b, depression of the actuating switch button 37 is ceased. The actuating switch button 37 is urged upward by the force of the spring until the free end of the pin 47 reaches the lowermost point A of the cam groove 37b. Although the center-core pressing member 44 approaches the center core 23 of the magnetic sheet 22 again as a result of the re-depression of the actuating switch button 37, engagement of the center-core pressing member 44 with the center core 23 can be prevented by selecting the hill point D to be lower than the uppermost point B of the cam groove 37b. At the break points A, B, C and D where the direction of movement of the pin 47 changes, the depth of the cam groove 37b is successively stepped at the bottom of those points, so that, as the actuating switch button 37 makes its vertical movement, the free end of the pin 47 circulates always in one and the same direction along the cam groove 37b.

Thus, in the first embodiment, when the actuating switch button 37 is depressed once, the center-core pressing member 44 is actuated to impart pressure to the center core 23 of the magnetic sheet 22. Then, when the depression of the actuating switch button 37 is released, and the actuating switch button 37 is urged slightly upward, the center-core pressing member 44 moves away from the center core 23 of the magnetic sheet 22, and the magnetic-sheet drive motor 39 is energized to start the playback mode. Then, when the actuating switch button 37 is depressed again, the magnetic-sheet drive motor 39 is deenergized. Since, at this time, the center-core pressing member 44 does not engage the center core 23, there is no fear that the center-core pressing member 44 damages the rotating center core 23 by engaging therewith.

The center-core pressing member 44 employed in the first embodiment has a bifurcated pressing end. However, the center-core pressing member may have a pressing end of other shape, for example, a cylindrical shape and may be pressed against the circumference of the center core 23 by the edge of such an end. In the aforementioned embodiment, the actuating switch button 37 is disposed in coaxial relation with the drive shaft 31 and moves in its axial direction. Therefore, the aforementioned embodiment is advantageous in that the connecting member 45 of very simple structure can be used, and the actuating switch button 37, center-core pressing member 44 and connecting member 45 can be integrally molded into a one-piece structure when so desired. However, the present invention is in no way limited to such an arrangement. For example, the actuating switch button 37 may be disposed at a position remote from the center-core pressing member 44, and they may be mechanically connected by a connecting member such as a link. The structure of the actuating switch is in no way limited to the illustrated one. For example, another switch may be provided to deenergize the motor 39 so that the center-core pressing member 44 may not contact the center core 23 when the motor 39 is deenergized. The actuating switch referred to in the first embodiment of the present invention is not limited to that provided for starting and stopping the playback mode. For example, the center-core pressing member 44 may be interlocked with an actuating switch for starting and stopping the record mode.

In the aforementioned embodiment, the center-core pressing member 44 imparts pressure to the center core 23 of the magnetic sheet 22 in response to the depression of the actuating switch button 37 at the time of starting reproduction of information from the magnetic sheet 22. However, the arrangement may be such that the center-core pressing member imparts pressure to the center core in a non-depressed state of the actuating switch button, and the pressure imparted to the center core by the center-core pressing member is released in response to depression of the actuating switch button.

Figure 8:
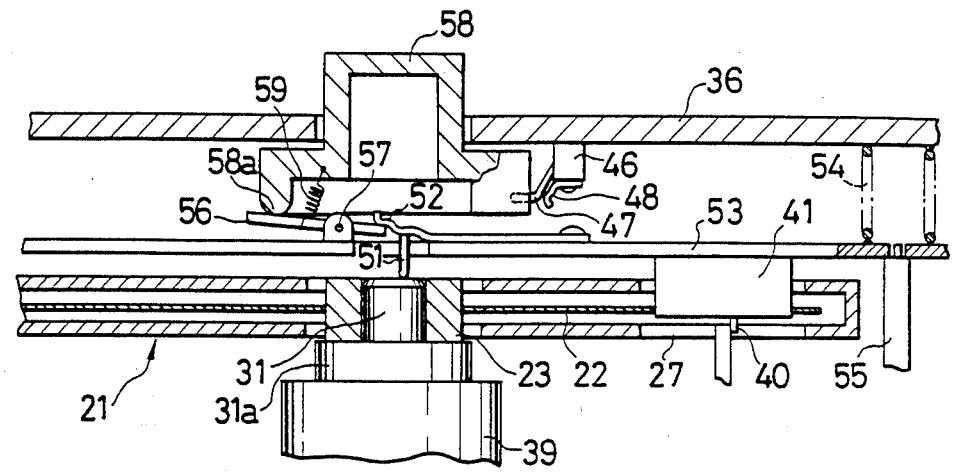
FIGS. 8 and 9 are schematic sectional views of part of a second embodiment of the rotary magnetic sheet apparatus according to the present invention respectively.
Figure 9:
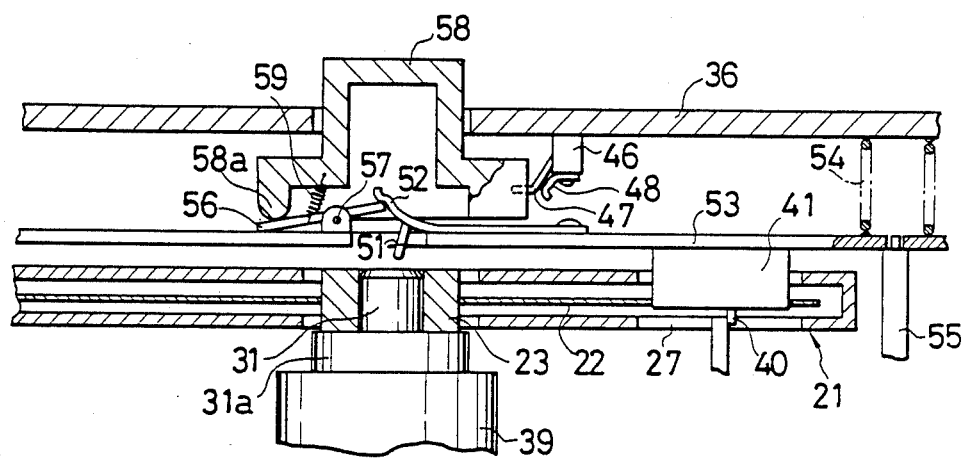

FIGS. 8 and 9 are schematic sectional views of part of a second embodiment of the rotary magnetic sheet apparatus of the present invention in which such an arrangement is employed. Referring to FIG. 8, a center-core pressing member 51 in the second embodiment is mounted to a regulating-member holder 53 by a supporting member 52 of a resilient material. The regulating member 41 is fixed to the regulating-member holder 53. The regulating-member holder 53 is mounted inside the cover member 36 of the apparatus through a coil spring 54 and is positioned by a positioning pin 55 erected on the inner bottom of the casing 35 to hold the regulating member 41 at a predetermined position in the casing 35 when the cover member 36 is closed. When the regulating-member holder 53 is so positioned, the center-core pressing member 51 abuts the center core 23, and pressure is imparted to the center core 23 by the spring force of the supporting member 52. As in the case of the first embodiment, the center-core pressing member 51 has a bifurcated pressing end which engages the upper surface of the center core 23. A rocking member 56 is rockably supported by a pin 57 on the regulating-member holder 53, and one end of the rocking member 56 engages the lower surface of the free end of the supporting member 52. The other end of the rocking member 56 engages a projection 58a of a switch button 58 of an actuating switch, and a spring 59 is interposed under tension between the actuating switch button 58 and the rocking member 56 so that the rocking member 56 is normally pressed at the other end thereof against the projection 58a of the actuating switch button 58 by the force of the spring 59. As in the case of the first embodiment, the actuating switch button 58 is supported so as to be movable relative to the cover member 36 in the vertical direction in FIG. 8, and the actuating switch is turned on in response to depression of the actuating switch button 58.

Thus, the arrangement is such that, when the regulating-member holder 53 is positioned as a result of closure of the cover member 36, the center-core pressing member 51 abuts the center core 23 of the magnetic sheet 22, and pressure is imparted to the center core 23 by the spring force of the supporting member 52 itself. Such a state is shown in FIG. 8. On the other hand, when the actuating switch button 58 is depressed to turn on the actuating switch, the projection 58a of the actuating switch button 58 causes counter-clockwise rocking movement of the rocking member 56 as shown in FIG. 9, and one end of the rocking member 56 urges upward the associated free end of the supporting member 52 thereby releasing the pressure imparted to the center core 23 by the center-core pressing member 51.

An actuating switch of depression type is referred to in the aforementioned embodiments. However, an actuating switch of another type such as a slide type or a rotary type can also be used.

Figure 10:
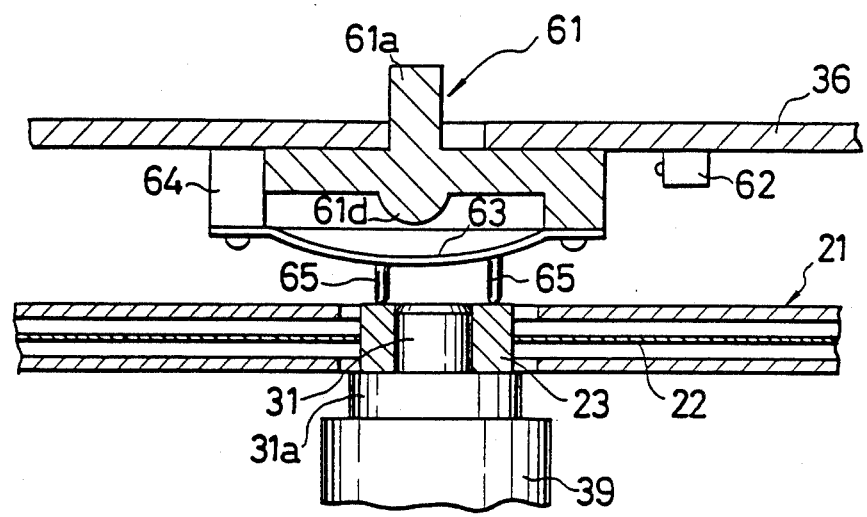
Figure 11:
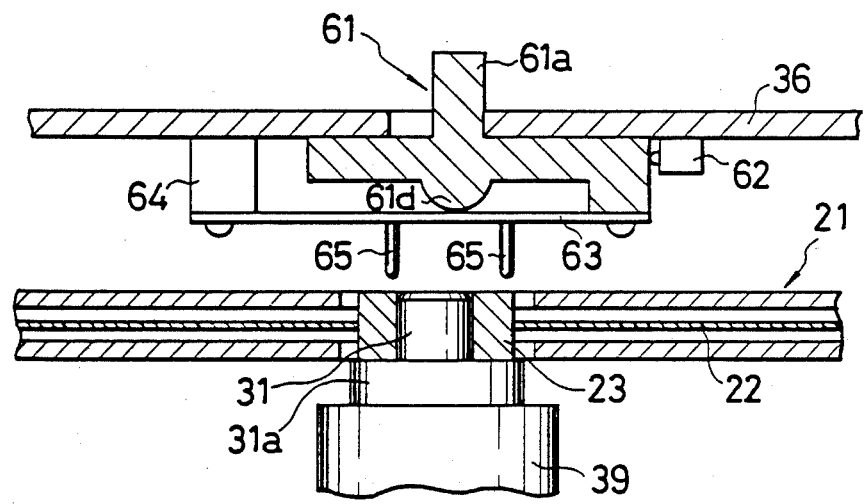
Figure 12:
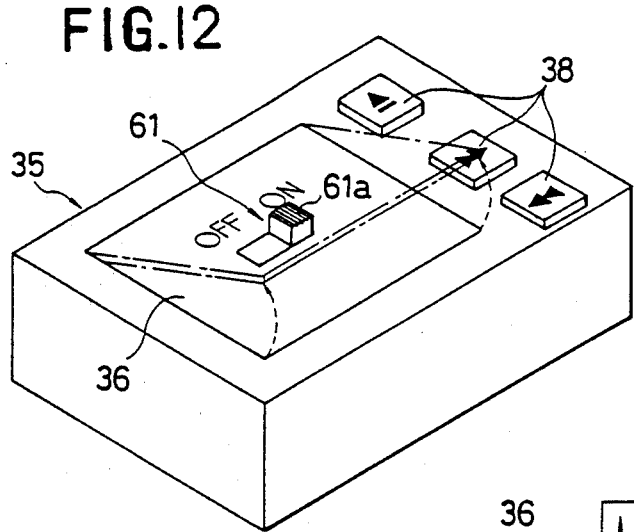
Figure 13:
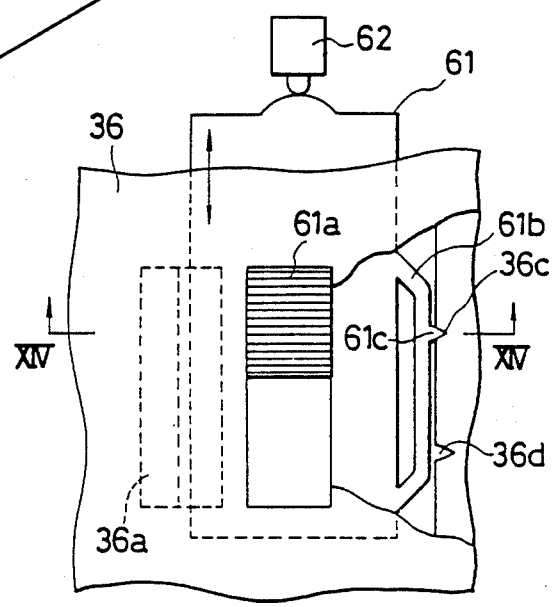
Figure 14:
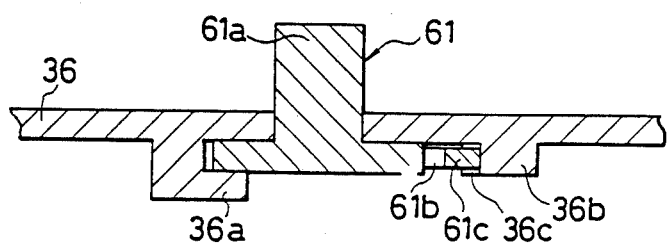

FIGS. 10 to 14 show a third embodiment of the present invention employing an actuating switch of slide type. Referring to FIG. 12, an actuating switch lever 61 is disposed at a central part of the cover member 36 openably closing the opening formed in the upper wall of the casing 35. As shown in FIGS. 13 and 14, a manipulating part 61a of the actuating switch lever 61 protrudes from the upper surface of the cover member 36 to be manipulated by a user and is supported by a guide 36a formed on the lower surface of the cover member 36 so that the actuating switch lever 61 is slidable in directions as shown by the arrows in FIG. 13. A locking projection 61c is formed on a resilient portion 61b extending from a side surface of the actuating switch lever 61, and an engaging portion 36b extending from the lower surface of the cover member 36 at a position opposite to the locking projection 61c is formed with two spaced cutouts 36c and 36d to be selectively engaged by the locking projection 61c. When the locking projection 61c engages the cutout 36c or 36d, the actuating switch lever 61 is locked in that position. Referring to FIGS. 10 and 11, a switch 62 is fixedly mounted on the lower surface of the cover member 36. When the locking projection 61c of the actuating switch lever 61 engages one of the cutouts or the cutout 36c, that is, when the actuating switch lever 61 is locked in its on position, the switch 62 is turned on by the actuating switch lever 61. In response to the output signal of the switch 62, a control circuit (not shown) acts to energize the magnetic-sheet drive motor 39 so as to rotate the magnetic sheet 22, and information recorded on the magnetic sheet 22 is reproduced by the magnetic head 40 (not shown).

As shown in FIG. 10, a supporting member 63 is disposed opposite to the drive shaft 31. This supporting member 63 is fixed at one end thereof to the lower surface of the cover member 36 by a fitting 64 and at the other end thereof to the lower surface of the actuating switch lever 61. The supporting member 63 is in the form of a leaf spring, and a pair of center-core pressing members 65 are fixed to the surface of the supporting member 63 at a position opposite to the center core 23 of the magnetic sheet 22 mounted on the drive shaft 31.

When the locking projection 61c of the actuating switch lever 61 engages the cutout 36d, that is, when the actuating switch lever 61 is locked in its off position, the distance between the both ends of the supporting member 63 is shortened to cause bending of the supporting member 63. As a result, the center-core pressing members 65 abut the center core 23 of the magnetic sheet 22, and pressure is imparted to the center core 23 by the spring force of the supporting member 63 itself. Such a state is shown in FIG. 10. On the other hand, when the actuating switch lever 61 is shifted to and locked in its on position so as to turn on the switch 62, the end-to-end distance of the supporting member 63 is widened to cause extension of the supporting member 63, and the center-core pressing members 65 move away from the center core 23 of the magnetic sheet 22. A projection 61d is provided at a portion of the actuating switch lever 61 opposite to the supporting member 63 so that, when bending of the supporting member 63 toward the actuating switch lever 61 occurs, the projection 61d abuts the supporting member 63 to prevent excessive bending of the supporting member 63 in such a direction.

Figure 15:
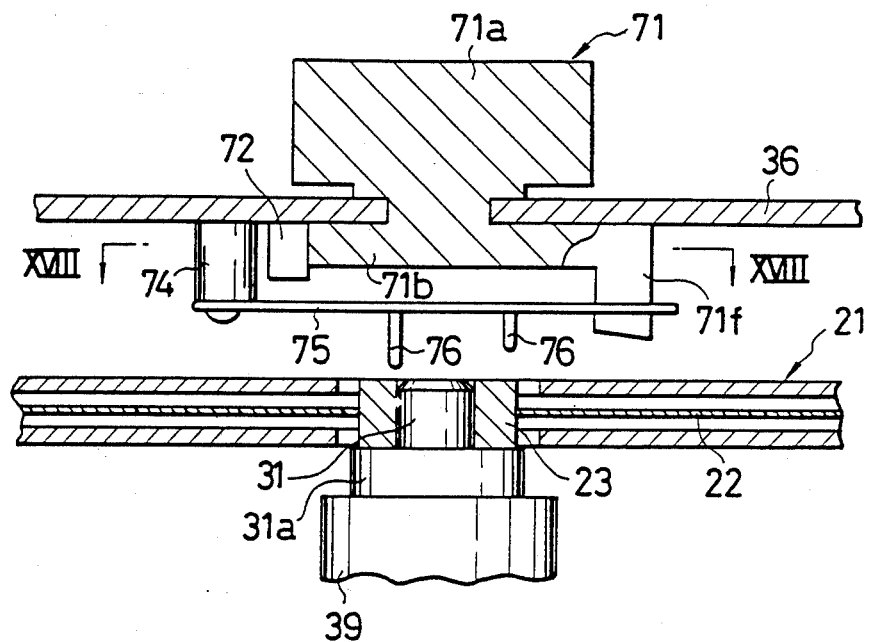
Figure 16:
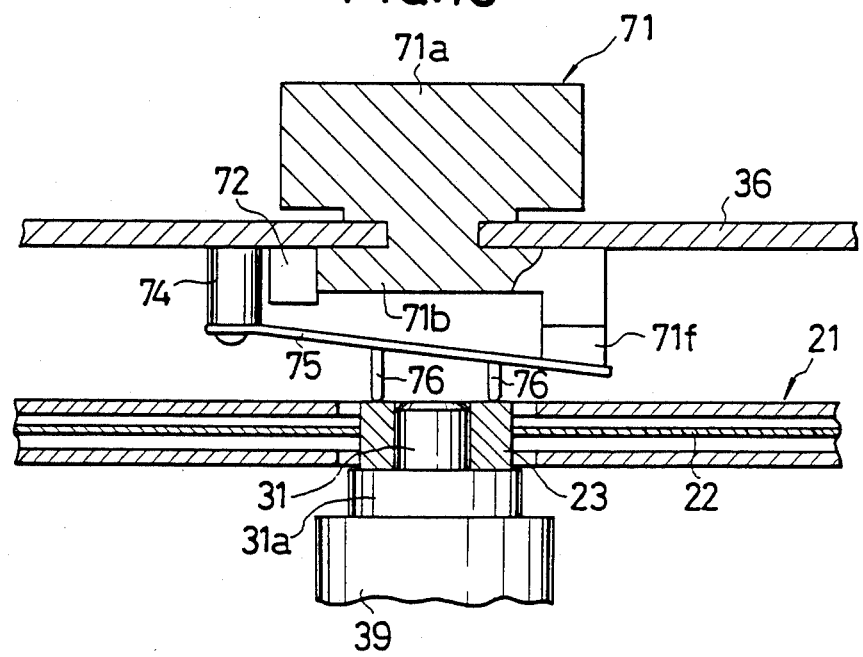
Figure 17:
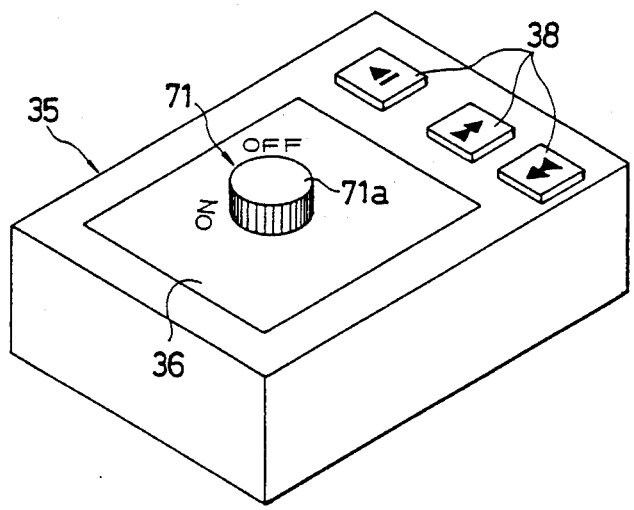
Figure 18:
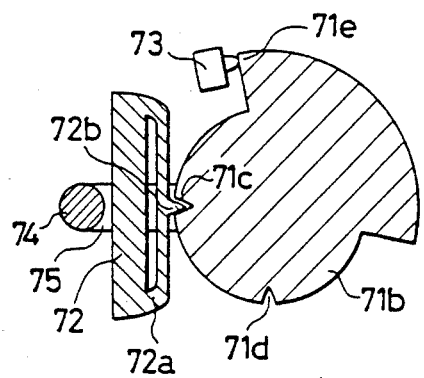

FIGS. 15 to 21 show a fourth embodiment of the present invention employing an actuating switch of rotary type. Referring to FIG. 17, an actuating switch knob 71 is disposed at a central part of the cover member 36 openably closing the opening formed in the upper wall of the casing 35. The actuating switch knob 71 is freely rotatably supported in the cover member 36, and its manipulating part 71a protrudes from the upper surface of the cover member 36 to be manipulated by a user. As shown in FIGS. 15 and 18, the actuating switch knob 71 has a disk-shaped part 71b on the lower surface side of the cover member 36, and two cutouts 71c and 71d circumferentially spaced by an angle of 90° are formed at the peripheral surface of the disk-shaped part 71b. On the other hand, an engaging member 72 is secured to the lower surface of the cover member 36 at a position adjacent to the disk-shaped part 71b, and a locking projection 72b formed on a resilient portion 72a extending from the engaging member 72 is adapted to selectively engage the cutouts 71c and 71d of the disk-shaped part 71b so as to lock the actuating switch knob 71 in a selected position of rotation. A switch 73 is fixed to the lower surface of the cover member 36, and a projection 71e for energizing the switch 73 is formed on the disk-shaped part 71b, so that the switch 73 is turned on by the projection 71e when one of the cutouts or the cutout 71c of the disk-shaped part 71b is engaged by the locking projection 72b, that is, when the actuating switch knob 71 is locked in its on position.

On the other hand, a supporting member 75 fixed at one end thereof to the lower surface of the cover member 36 through a fitting 74 is disposed opposite to the drive shaft 31 as shown in FIG. 15. The supporting member 75 has a pair of center-core pressing members 76 secured to its surface opposite to the center core 23 of the magnetic sheet 22 mounted on the drive shaft 31. The supporting member 75 itself is in the form of a leaf spring, and its free end is urged toward the disk-shaped part 71b by the spring force of its own. On the other hand, the disk-shaped part 71b is formed with a cam portion 71f at a position opposite to the free end of the supporting member 75, and this cam portion 71f is engaged by the free end of the supporting member 75. Over the rotation range of the actuating switch knob 71 from the off position where the locking projection 72b engages the cutout 71d of the disk-shaped part 71b to the on position where the locking projection 72b engages the cutout 71c of the disk-shaped part 71b, a cam surface engaged by the free end of the supporting member 75 is formed on the cam portion 71f and has a highest cam lift at its middle position.

Figure 19:
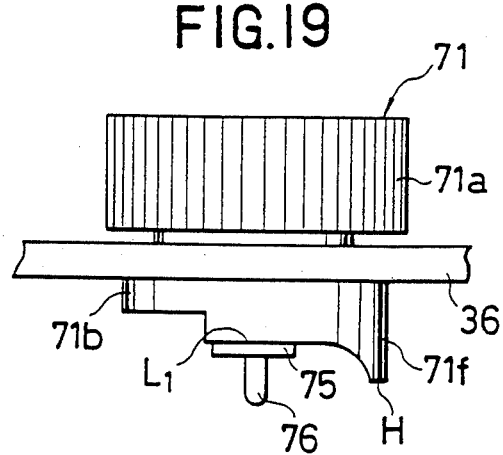
Figure 20:
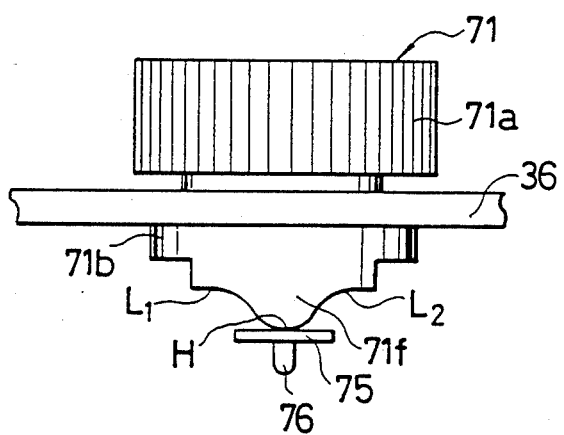
Figure 21:
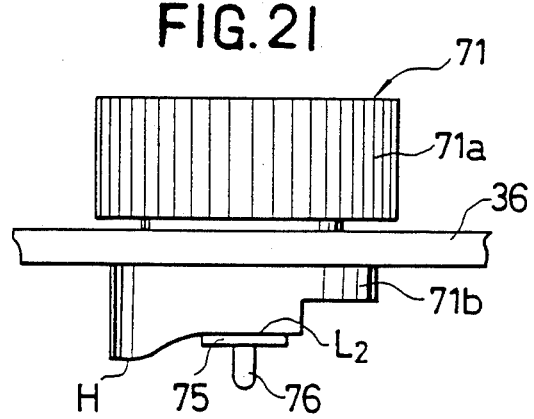

Therefore, when the actuating switch knob 71 is locked in its off position, the supporting member 75 is engaged by a first low-lift land L1 of the cam portion 71f, and the free end of the supporting member 75 moves upward as shown in FIG. 19. As a result, the center-core pressing members 76 are disengaged from the center core 23 as shown in FIG. 15. Then, when the actuating switch knob 71 is rotated to its on position to turn on the switch 73, the supporting member 75 is engaged by a high-lift land H of the cam portion 71f in the course of the rotating movement of the actuating switch knob 71 as shown in FIG. 20, and the free end of the supporting member 75 moves downward. As a result, the center-core pressing member 76 abut the center core 23 of the magnetic sheet 22 as shown in FIG. 16, and pressure is imparted to the center core 23 by the spring force of the supporting member 75 itself. The length of the center-core pressing member 76 nearer to the free end of the supporting member 75 is slightly shorter than that of the other, so that the center-core pressing members 76 can impart a uniform pressure to the center core 23 of the magnetic sheet 22. When the actuating switch knob 71 is further rotated from the position shown in FIG. 20 to the on position shown in FIG. 21, the free end of the supporting member 75 engages a second low-lift land L2 of the cam portion 71f, and the center-core pressing members 76 are disengaged from the center core 23 of the magnetic sheet 22 again.

The aforementioned first, second, third and fourth embodiments have referred to application of the present invention to an apparatus of the type in which the cover member 36 is opened to permit loading and unloading of the magnetic sheet pack 21. However, it is apparent that the present invention is also equally effectively applicable to an apparatus of the so-called slot-in type in which the magnetic sheet pack 21 is loaded and unloaded through a slot provided in a side wall of the apparatus body.

It will be understood from the foregoing detailed description of various embodiments of the present invention that, in response to the on-off of an actuating switch, a center-core presesing member is actuated to impart pressure to or release pressure imparted to the center core of the magnetic sheet loaded in the rotary magnetic sheet apparatus. Therefore, the magnetic sheet can be loaded in the rotary magnetic sheet apparatus without requiring a complex mechanism for opening and closing the cover member of the apparatus, and, before the magnetic sheet starts to rotate, the center core pressing function is effected so as to reliably press the magnetic sheet onto the drive shaft.

As many apparently widely different embodiments of this invention may be made without departing from the spirit and scope thereof, it is to be understood that the invention is not limited to the specific embodiments thereof except as defined in the appended claims.

What is claimed is:

1. In a drive mechanism employed for recording and reproducing a magnetic disc:
   an actuator member supported for movement between a first, a second and a third position and return to said first position;
   a presser member carried by said actuator member and which is movable to engage and accurately position a magnetic disc inserted into said device when said actuator member is in a first position of said actuator member, and which is moved away from said disc to a disengaged position of said presser member when said actuator member is moved to said second position, and is retained disengaged as said actuator member is moved from said second position to said third position;

a switch interposed in an electrical supply line of a drive motor of said device and which is operated to a closed position upon movement of said actuator member from said second position to said third position, and, which is disengaged upon subsequent movement of said actuator member from said third position to said first position;

whereby, said presser member is engaged with said magnetic disc prior to energization of the drive motor of said device.

2. The drive mechanism of claim 1, in which said presser member is moved into engagement with said disc upon movement of said actuator member from said first position to said second position, and is subsequently moved reversely into a disc disengaged position upon movement of said actuator member from said second position to said third position and the return of said actuator member from said third position to said first position.

3. The drive mechanism of claim 1, in which said actuator member is a depressable member which is spring-biased to said first position.

4. The drive mechanism of claim 1, in which said actuator member is a slidable member supported for sliding movement in a housing of said drive mechanism.

5. The drive mechanism of claim 1, in which said actuator member is a rotary member.

* * * * *